(12) United States Patent
De Graaf et al.

(10) Patent No.: US 9,527,255 B2
(45) Date of Patent: Dec. 27, 2016

(54) ASSEMBLY AND A METHOD OF MANUFACTURING A GREEN TIRE AND/OR AN UNCURED SPRING

(71) Applicants: Martin De Graaf, KZ Emst (NL); Jan Kornelis Grashuis, CG Apeldoorn (NL); Johan Gerard Van Beek, SC Hengelo (NL)

(72) Inventors: Martin De Graaf, KZ Emst (NL); Jan Kornelis Grashuis, CG Apeldoorn (NL); Johan Gerard Van Beek, SC Hengelo (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 14/238,754

(22) PCT Filed: Sep. 27, 2012

(86) PCT No.: PCT/NL2012/050676
§ 371 (c)(1),
(2) Date: Feb. 13, 2014

(87) PCT Pub. No.: WO2013/048244
PCT Pub. Date: Apr. 4, 2013

(65) Prior Publication Data
US 2014/0190618 A1 Jul. 10, 2014

Related U.S. Application Data

(60) Provisional application No. 61/541,110, filed on Sep. 30, 2011.

(30) Foreign Application Priority Data

Sep. 27, 2011 (NL) ..................................... 2007485

(51) Int. Cl.
*B29D 30/20* (2006.01)
*B29D 30/30* (2006.01)
(Continued)

(52) U.S. Cl.
CPC ............ *B29D 30/30* (2013.01); *B29D 30/1628* (2013.01); *B29D 30/26* (2013.01); *B29D 30/3028* (2013.01);
(Continued)

(58) Field of Classification Search
CPC ............ B29D 30/1621; B29D 30/1628; B29D 30/1635; B29D 30/26; B29D 30/3021; B29D 30/3028; B29D 30/3035; B29D 30/32; B29D 2030/1678; B29D 2030/2671; B29D 2030/2678; B29D 2030/2685; B29D 2030/2692; B29D 2030/3078; B29D 2030/3257
See application file for complete search history.

(56) References Cited

U.S. PATENT DOCUMENTS 1,734,835 A * 11/1929 Strum ............................ 156/132
2,699,198 A * 1/1955 Balzhiser ................... 29/894.37
(Continued)

FOREIGN PATENT DOCUMENTS

CN 102015272 A 4/2011
DE 1 175 870 8/1964
(Continued)

OTHER PUBLICATIONS

Machine generated English language translation of EP 1658952 (original document dated May 2006).*
(Continued)

*Primary Examiner* — Martin Rogers
(74) *Attorney, Agent, or Firm* — Ladas & Parry LLP

(57) ABSTRACT

The invention relates to an assembly and a method for manufacturing a green tire and/or a green air spring. The
(Continued)

device comprises a template having a shaping surface (2) for placing a tire component thereon comprising a layer of unvulcanized rubber for the green tire and/or green air spring. The shaping surface (2) is provided with an attachment surface (9) for at least temporarily retaining at least a leading section of the tire component. The attachment surface (9) comprises a number of adhering surface sections (3) with non-adhering surface sections (4) placed in between them, wherein the non-adhering surface sections (4) are at least partially receded with respect to the adhering surface sections (3). In one embodiment the attachment surface (9) comprises a substantially saw-tooth-shaped cross-section.

7 Claims, 7 Drawing Sheets

(51) Int. Cl.
  *B29D 30/26* (2006.01)
  *B29D 30/16* (2006.01)
  *B29D 30/32* (2006.01)
  *B29D 30/60* (2006.01)
  *B29D 30/44* (2006.01)
  *B29D 30/48* (2006.01)

(52) U.S. Cl.
  CPC ............. *B29D 30/32* (2013.01); *B29D 30/60* (2013.01); *B29D 2030/1678* (2013.01); *B29D 2030/2614* (2013.01); *B29D 2030/2671* (2013.01); *B29D 2030/3078* (2013.01); *B29D 2030/3264* (2013.01); *B29D 2030/4468* (2013.01); *B29D 2030/481* (2013.01)

(56) References Cited

U.S. PATENT DOCUMENTS

| | | | | |
|---|---|---|---|---|
| 3,130,100 | A * | 4/1964 | Hasselquist | 156/157 |
| 3,767,509 | A | 10/1973 | Gazuit | |
| 3,887,423 | A | 6/1975 | Gazuit | |
| 3,895,986 | A * | 7/1975 | Komatsu et al. | 156/136 |
| 4,090,909 | A | 5/1978 | Christie et al. | |
| 5,038,440 | A * | 8/1991 | Demuth et al. | 19/114 |
| 5,337,817 | A * | 8/1994 | Steinbeck | B60B 30/08 |
| | | | | 157/1.24 |
| 5,424,015 | A * | 6/1995 | Matsuda et al. | 264/130 |
| 5,507,334 | A * | 4/1996 | Theuber | B60C 25/135 |
| | | | | 157/1 |
| 5,667,610 | A * | 9/1997 | Yoshida et al. | 156/133 |
| 6,524,416 | B1 * | 2/2003 | Kubinski | B29D 30/48 |
| | | | | 156/131 |
| 6,630,045 | B1 * | 10/2003 | Roedseth | B29D 30/32 |
| | | | | 156/130.7 |
| 6,837,292 | B2 * | 1/2005 | De Graaf et al. | 156/402 |
| 2003/0047284 | A1 * | 3/2003 | Akiyama | B29D 30/245 |
| | | | | 156/415 |
| 2003/0102088 | A1 * | 6/2003 | Iiduka | 156/394.1 |
| 2004/0089400 | A1 * | 5/2004 | Vargo | B29C 47/0019 |
| | | | | 156/136 |
| 2006/0237112 | A1 * | 10/2006 | Nishitani et al. | 152/524 |
| 2006/0272780 | A1 * | 12/2006 | Takagi | 156/502 |
| 2007/0102120 | A1 * | 5/2007 | Yoshii | 156/394.1 |
| 2007/0261578 | A1 * | 11/2007 | Suda | 101/376 |
| 2009/0133808 | A1 * | 5/2009 | Tatara et al. | 156/111 |
| 2009/0289143 | A1 | 11/2009 | Tanaka et al. | |
| 2009/0293267 | A1 * | 12/2009 | Slots et al. | 29/802 |
| 2010/0288423 | A1 * | 11/2010 | Marchini | B29D 30/16 |
| | | | | 156/123 |
| 2014/0190618 | A1 * | 7/2014 | De Graaf et al. | 156/123 |

FOREIGN PATENT DOCUMENTS

| | | | | |
|---|---|---|---|---|
| DE | 28 03 460 A1 | | 8/1979 | |
| DE | 3236610 | * | 4/1984 | ............. B60B 21/10 |
| EP | 0 340 147 A2 | | 11/1989 | |
| EP | 1658952 | * | 5/2006 | ............. B29C 65/00 |
| EP | 1 690 667 A1 | | 8/2006 | |
| EP | 1 985 561 A1 | | 10/2008 | |
| EP | 1 827 807 B1 | | 2/2010 | |
| JP | 7-1603 A | | 1/1995 | |
| JP | 11-105155 A | | 4/1999 | |
| JP | 2002-234081 A | | 8/2002 | |
| JP | 2002-370292 A | | 12/2002 | |
| JP | 2003-526546 A | | 9/2003 | |
| JP | 2009-184212 | * | 8/2009 | ............. B29D 30/48 |
| JP | 2009-184212 A | | 8/2009 | |
| SU | 1291436 A2 | | 2/1987 | |
| WO | 01/68356 A1 | | 9/2001 | |
| WO | 2004/045839 A1 | | 6/2004 | |
| WO | 2010/064084 A1 | | 6/2010 | |
| WO | WO 2010/064084 | * | 6/2010 | ............. B29D 30/24 |

OTHER PUBLICATIONS

Machine generated English language translation of JP 2009-184212 (original document dated Aug. 2009).*
Machine generated English language translation of DE 3236610 (original document dated Apr. 1984).*
International Search Report dated Dec. 12, 2012 for Application No. PCT/NL2012/050676.
Decision on Grant issued in connection with Russian patent application No. 2014108599 on May 25, 2015, with English translation.
Machine Translation into English of SU 1291436 A2 obtained on Jul. 13, 2015, 3 pages.
Office Action (Notification of Reasons for Refusal) dated Aug. 11, 2015 for Japanese Application No. 2014-531750 with English translation.
Office Action dated Sep. 15, 2015 for Chinese Application No. 201280038887.2 with English translation.
J-PlatPat English translation of JP 2009-184212 A.
J-PlatPat English translation of JP 7-1603 A.
J-PlatPat English translation t of JP 2002-370292 A.
espacenet English abstract of CN 102015272 A.
English abstract of JP 2003-526546A.
J-PlatPat English translation of JP 11-105155 A.
Espacenet English abstract of JP 7-1603 A.
Espacenet English abstract of JP 11-105155 A.
Espacenet English abstract of JP 2002-234081 A.

* cited by examiner

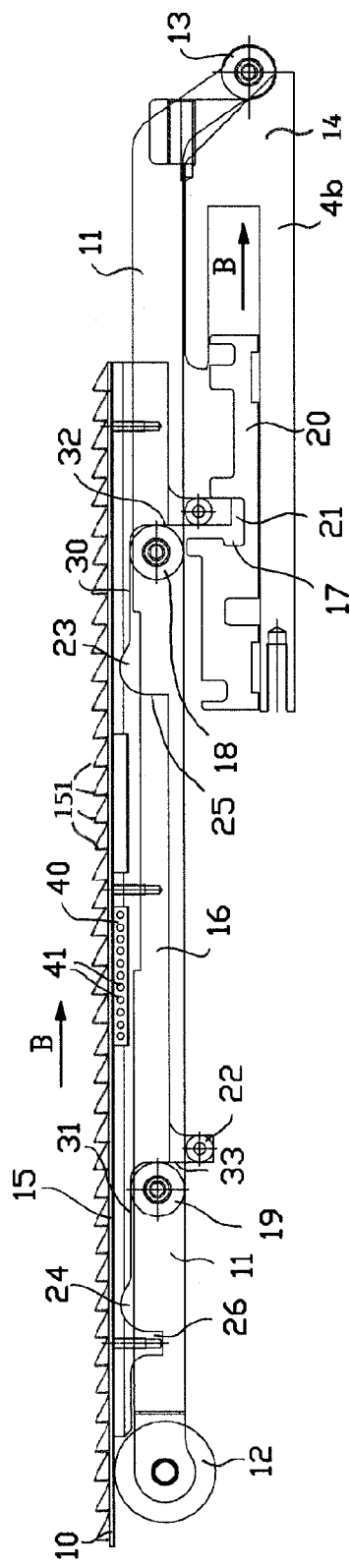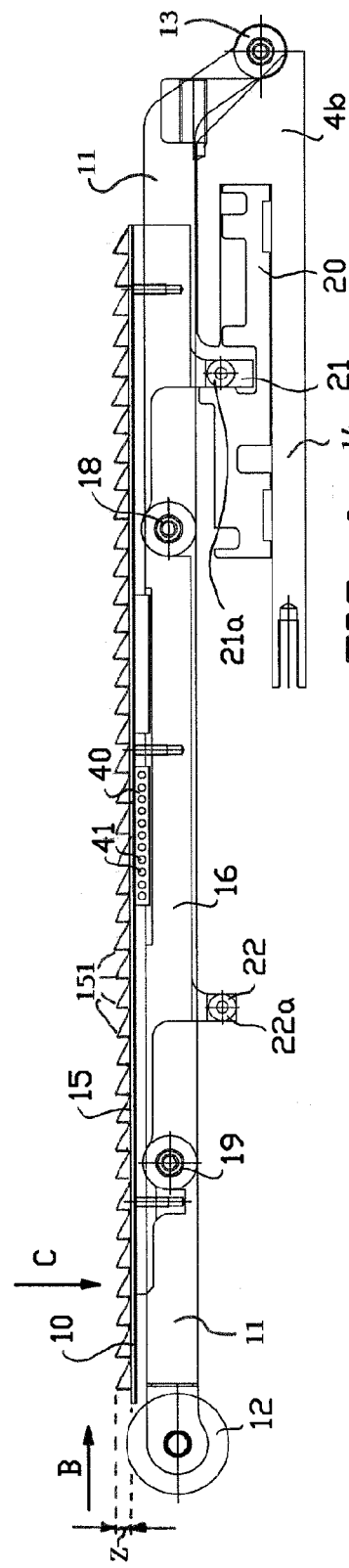

ASSEMBLY AND A METHOD OF MANUFACTURING A GREEN TIRE AND/OR AN UNCURED SPRING

RELATED APPLICATION INFORMATION

This application is a 371 of International Application PCT/NL2012/050676 filed 27 Sep. 2012 entitled "An Assembly and a Method of Manufacturing a Green Tire and/or an Uncured Spring.", which was published in the English language on 4 Apr. 2013, with International Publication Number 2013/048244A1, and which claims priority from Netherland Patent Application No. 2007485 filed 27 Sep. 2011 and U.S. Provisional Application No. 61/541,110 filed 30 Sep. 2011, the contents of which are incorporated herein by reference.

BACKGROUND OF THE INVENTION

The present invention relates to an assembly and method for manufacturing a green tyre and/or a green air spring.

It is common practice to arrange tyre components such as various plies for a tyre on a building drum. Various layers of rubber, such as for instance the airtight liner, the sidewalls and the tread are combined with reinforcement plies, such as for instance carcass plies and breaker plies.

For manufacturing a tyre, such as for instance a car tyre or truck tyre, the tyre components, particularly the various layers of unvulcanized rubber, in the form of bands of rubber material are placed on the building drum, and formed further into a green tyre. It is among other things of importance that the tyre component is placed at the correct position on the building drum.

Another method of manufacturing a tyre is to build up the layers of rubber material on the building drum by means of a process that is usually referred to as 'strip winding'. Such a method and related device are for instance described in EP 1.827.807. The device is provided with an extrusion device that is adapted for extruding a thin strip of unvulcanized rubber, wherein the extruded strip is helically wound around the building drum for thus forming the desired layer of the rubber material. As the desired layer is in fact built up on the building drum by winding a thin strip, the dimensions of the desired layer can easily be adjusted by adjusting the winding process. A drawback of 'strip winding' is that particularly the accuracy of the dimensions of the obtained layer by building up by means of winding an extruded strip on a rotating drum is less than in case of arranging a pre-fabricated band of rubber material.

SUMMARY OF THE INVENTION

It is an object of the invention to provide an assembly and a method for manufacturing a green tyre, wherein at least one of the above-mentioned drawbacks, is at least partially overcome.

According to a first aspect the invention for that purpose provides an assembly for manufacturing a green tyre and/or a green air spring, comprising a template having a shaping surface for placing a tyre component for the green tyre and/or green air spring thereon, wherein the tyre component comprises a layer of unvulcanized rubber, wherein the shaping surface is provided with an attachment surface for at least temporarily retaining at least a leading section of the strip of the unvulcanized rubber, wherein the attachment surface comprises a number of adhering surface sections with non-adhering surface sections placed in between them, wherein the non-adhering surface sections are at least partially receded with respect to the adhering surface sections.

Due to the attachment surface of the template the tyre component, particularly at least its leading section, placed on the shaping surface of the template, can temporarily be retained on the shaping surface. In that way it can at least substantially be prevented that at least the leading section of the tyre component shifts when the tyre component is arranged further and the strip can be placed more accurately with respect to the position on the shaping surface and/or with respect to an adjacent tyre component or part thereof. The accuracy of the dimensions of the obtained green tyre and/or green air spring built up by means of arranging a tyre component on the shaping surface of the template according to the invention can thus be greater than is the case with the known devices.

The attachment surface comprises a number of adhering surface sections with non-adhering surface sections placed in between them. Due to said combination of adhering surface sections retaining the tyre component and non-adhering surface sections placed in between them, the level of adhesion can be adjusted so that it is large enough for at least retaining the leading section of the tyre component during its arrangement and so that it is small enough that the layer of tyre component after having been placed can be released from the shaping surface substantially without damage.

The non-adhering surface sections are at least partially receded with respect to the adhering surface sections. An example of such receded surface sections are grooves or holes in the smooth surface sections, wherein said grooves or holes have a width or diameter that is substantially smaller than the width of the strip. In that way the tyre component, at least its layer of unvulcanized rubber, will not abut the receded surface sections and the tyre component cannot stick to said non-adhering surface sections.

On the one hand the grooves or holes can be arranged in a regular pattern. On the other hand the grooves or holes can also be arranged in a substantially random pattern, for instance in the form of a substantially rough non-adhering surface section.

In one embodiment the attachment surface comprises a substantially saw-tooth-shaped cross-section. In that case the adhering surface sections are situated on or near the tips of the saw-tooth and the non-adhering surface sections are situated in or near the valleys of the saw-tooth. In one embodiment of the saw-tooth shape with alternately inclined ascending flanks and steep transitions from the one to the next saw-tooth, at least the tip of the inclined ascending flanks of the saw-tooth form the adhering surface sections and the steep transitions and/or the parts of the inclined ascending flank adjacent to the steep transition form the non-adhering, receded surface sections. An advantage of the saw-tooth-shaped cross-section is that after the tyre component has at least been partially released from the attachment surface, said layer is able to rest on at least the tips of the saw-tooth, substantially without the tyre component adhering again to the attachment surface.

In one embodiment the adhering surface sections comprise one or more smooth surface sections, particularly polished surface sections, more particularly surface sections of metal. Unvulcanized rubber particularly seems to stick to a smooth surface, such as a polished metal surface. The invention utilises this for retaining at least the leading section of the tyre component, at least its layer of unvulcanized rubber, on the shaping surface. Preferably the shaping surface is not entirely provided with a smooth surface, but only one or more surface sections are provided with a smooth surface. In that way it can substantially be prevented that the entire tyre component sticks to the shaping surface.

In one embodiment the template is further provided with a release device for releasing at least the leading section of the tyre component of unvulcanized rubber.

In one embodiment the release device comprises a number of blow nozzles for blowing at least the leading section of the tyre component of the unvulcanized rubber off from the attachment surface. By connecting the blow nozzles to a pressure medium, such as compressed air, an overpressure can be generated between the tyre component and the attachment surface, as a result of which the tyre component is at least partially pushed off from the attachment surface and is thus released.

In one embodiment the release device comprises a displacement device for displacing at least the attachment surface, particularly with respect to the shaping surface.

In one embodiment the displacement device is adapted for at least displacing the attachment surface in a direction substantially parallel to the attachment surface and/or the layer of unvulcanized rubber. Particularly because of the combination of a number of smooth surface sections with non-adhering surface sections placed in between them of the attachment surface according to the invention, the displacement causes a non-adhering surface section to be slid into the place of a adhering surface section as a result of which the layer is at least partially released from the attachment surface.

In one embodiment the displacement device is adapted for at least displacing the attachment surface in a direction substantially perpendicular to the layer of unvulcanized rubber and/or in a direction facing away from the tyre component. Because of the displacement an adhering surface section of the tyre component, particularly its layer of unvulcanized rubber, can be slid away as a result of which the layer is at least partially released from the attachment surface.

In one embodiment the template comprises a drum having an outwardly oriented shaping surface. On the one hand the drum may be a building drum, as described in applicant's US patent application 2003/034132, for manufacturing at least a part of the green tyre and/or the green air spring thereon. On the other hand the drum may be a transfer drum, as described in applicant's Dutch patent application 2007058, wherein the layer of rubber material manufactured on the shaping surface can be transferred to a building drum for manufacturing at least a part of the green tyre and/or green air spring thereon.

In one embodiment the attachment surface comprises a band with the number of adhering surface sections. In one embodiment the band extends substantially parallel to a centre line of the drum. In that case the tyre component is retained substantially over the width of the band when winding the tyre component onto the shaping surface of the drum.

In a further embodiment thereof the drum is provided with a set of arms that extend axially, wherein at a first free outer end each arm is provided with a first turn-up means, particularly a turn-up roller, and at an opposite second outer end is hinged to an axially slidable arm support, wherein near its first outer end each arm is provided with a support member for supporting the layer of rubber material, wherein the support member of at least one of the arms comprises the attachment surface.

In one embodiment the support members can be displaced in an axial direction of the drum. That means that the attachment surface can be displaced in a direction substantially parallel to a layer of rubber material or tyre component on the drum.

In one embodiment the drum is provided with a bladder of which a part that is situated outward with respect to the drum forms at least a part of the shaping surface, wherein the part of the bladder situated outward with respect to the drum comprises the attachment surface. The use of such a bladder on a building drum is for instance described in U.S. Pat. No. 4,087,306.

In one embodiment the number of adhering surface sections with non-adhering surface sections placed in between them, are placed consecutively in a substantially axial direction of the drum. In one embodiment, at least when considered in a substantially axial direction of the drum, the attachment surface comprises the substantially saw-tooth-shaped cross-section. These embodiments can be used both on a drum having a set of axially extending arms, and on a drum having a bladder, as described above.

In one embodiment the template comprises a disc having a substantially circular shaping surface for placing the tyre component thereon. Such a disc can be used in manufacturing sidewalls of a car tyre or truck tyre as described in applicant's Dutch patent application 2007059.

In one embodiment the attachment surface comprises a band with the number of adhering surface sections, wherein the band extends substantially radially with respect to the circular shaping surface. In that case the tyre component is retained over its substantially radial width, particularly over the length of the band when placing the tyre component.

In one embodiment the number of adhering surface sections with non-adhering surface sections placed in between them, are placed consecutively at least considered in a substantially radial direction of the circular shaping surface. In one embodiment, at least considered in a substantially radial direction of the circular shaping surface, the attachment surface comprises a substantially saw-tooth-shaped cross-section.

In one embodiment the assembly further comprises an extrusion device for extruding a strip of an unvulcanized rubber, wherein the shaping surface of the template faces the extrusion device, and wherein the extrusion device and the template can be displaced with respect to each other for placing the strip of the unvulcanized rubber on the shaping surface for forming the layer of unvulcanized rubber of the tyre component. Because of the attachment surface of the template the strip placed on the shaping surface of the template, particularly at least the leading section of the strip, can be temporarily retained on the shaping surface. As a result it can at least substantially be prevented that at least the leading section of the strip shifts when further arranging the strip of the unvulcanized rubber, and the strip can be more accurately placed with respect to the position on the shaping surface and/or with respect to an adjacent strip. The accuracy of the dimensions of the obtained layer built up by means of arranging an extruded strip on the shaping surface of the template according to the invention can thus be greater than is the case with the known devices for 'strip winding'.

In one embodiment the template comprises a drum having an outwardly oriented shaping surface, wherein the drum and the extrusion device can be displaced with respect to each other for winding the strip of the unvulcanized rubber around the drum into the layer of rubber material. In one embodiment the attachment surface comprises a band with the number of adhering surface sections, wherein the band extends substantially parallel to a centre line of the building drum. In that case with every revolution the strip is placed anew on the attachment surface for retaining the strip.

In one embodiment the template comprises a disc having a substantially circular shaping surface, wherein the disc and the extrusion device can be displaced with respect to each other for on the disc arranging the strip of the unvulcanized rubber into the layer of rubber material. In one embodiment the attachment surface comprises a band with the number of adhering surface sections, wherein the band extends substantially radially with respect to the circular shaping surface. In that case with every revolution the strip is placed anew on the attachment surface for retaining the strip.

According to a second aspect the invention provides a method for manufacturing a green tyre or a green air spring by means of an assembly according to any one of the preceding claims, wherein the method comprises the following steps:

placing the tyre component, at least with its layer of unvulcanized rubber on the shaping surface of the template, wherein the leading section of the tyre component of the unvulcanized rubber is placed on the attachment surface for at least temporarily retaining the tyre component, and when the tyre component has been placed, providing a relative displacement between the layer of unvulcanized rubber and the attachment surface for releasing the tyre component.

In one embodiment the relative displacement is carried out substantially parallel to the attachment surface and/or the layer of unvulcanized rubber. In one embodiment the relative displacement is carried out along with an ascending inclined slope of the saw-tooth-shaped cross-section.

In one embodiment of the method with an assembly including extrusion device, the method further comprises the steps of:

extruding a strip of an unvulcanized rubber material from the extrusion device;

during extruding placing the strip on the shaping surface of the template, wherein the leading section of the strip of the unvulcanized rubber is placed on the attachment surface for at least temporarily retaining the strip; and further arranging the strip of the unvulcanized rubber on the shaping surface for forming the layer of unvulcanized rubber of the tyre component.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached drawings, in which:

FIGS. 5 and 6 show a schematic side view of a turn-up arm of a building drum provided with a support member having an attachment surface;

DETAILED DESCRIPTION OF THE DRAWINGS

Figure 1:
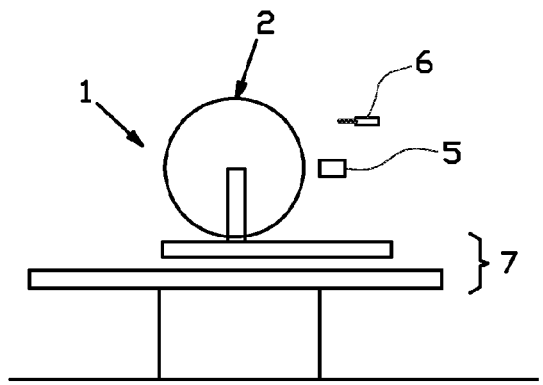
FIGS. 1, 2 and 3 show a schematic side view of different steps in manufacturing a layer of rubber material on a drum.

FIG. 1 shows a schematic view in cross-section of an exemplary embodiment of an assembly 1 according to the invention. The assembly comprises a drum 2 placed on a conveying device 7. The assembly further comprises an extrusion device 5 for extruding a strip 10 of an unvulcanized rubber.

Figure 2:
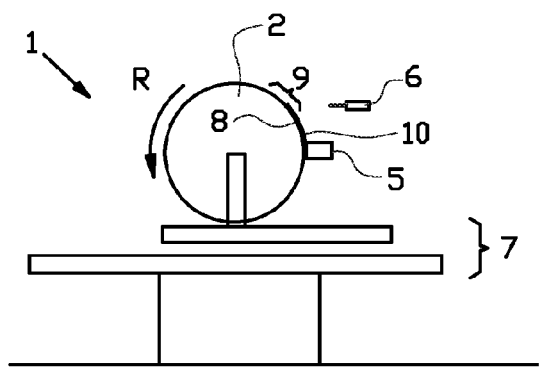

Prior to extrusion the circumferential surface of the drum 2 is placed near the extrusion device 5 by the conveying device 7, as shown in FIG. 2.

Figure 4:
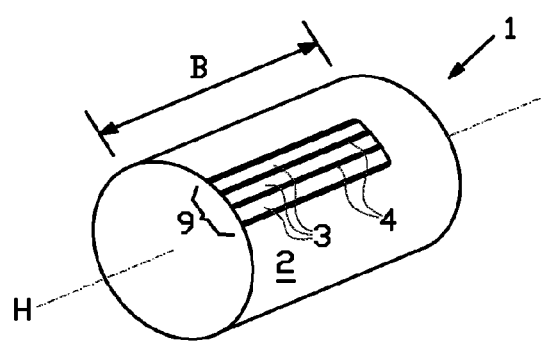
FIG. 4 shows a schematic view of a drum having an attachment surface extending substantially parallel to the centre line of the drum.

In order to retain the leading end of the strip 10 on the drum 2, it is provided with an attachment surface 9, for instance in the form of one or more smooth surface sections 3, particularly polished surfaces sections, as shown in FIG. 4. Optionally non-adhering surface sections 4 can be placed in between the one or more smooth surface sections 3. As shown in FIG. 4 the attachment surface 9 extends substantially parallel to the centre line H of the drum 2, over a part of or over the full width B of the drum 2.

It is noted here that the building drum 2 as shown in FIG. 4 can also be used for winding a pre-fabricated tyre component, such as for instance the airtight liner, the sidewalls, and the tread, combined with reinforcement plies, such as for instance carcass plies and breaker plies, on the building drum 2. In that case it will not be required to place an extrusion device for the manufacturing of the tyre component near the building drum.

Figure 3:
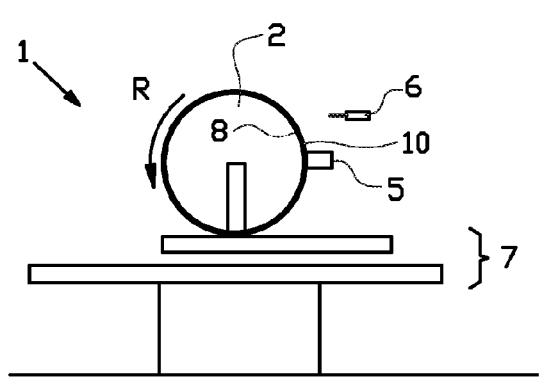

In an assembly with extrusion device 5, the strip 10 during its extrusion is wound onto the drum 2 that is rotating in the direction R, as shown in FIG. 3. As during extruding the drum 2 rotates and is slowly displaced axially, the strip 10 is wound substantially helically onto the drum 2 for forming a layer of rubber material.

After the layer of rubber material 10 has been completed, the drum 2 is moved away from the extrusion device 5.

If the drum 2 is a building drum, the layer of rubber material 10 can be turned up around a bead core in a known manner by means of a turn-up device of the building drum, for manufacturing a green tyre.

If the drum 2 is a transfer drum, the layer of rubber material is removed from the drum 2 and placed on a building drum for manufacturing a green tyre or green air spring. In one embodiment the layer of rubber material, prior to its removal from the drum, is cut through at least substantially in axial direction of the drum 2 by means of a cutting device 6 and the cut layer of rubber material can be transferred to a building drum, for instance a carcass drum.

In a further exemplary embodiment the drum 2 comprises a set of axially extending arms 11, such as for instance described in US patent application 2003/034132. At a first free outer end each arm 11 is provided with a first turn-up means, particularly a turn-up roller 12, and at an opposite second outer end 13 is hinged to an axially slidable arm support 14. Near its first outer end each arm 11 is furthermore provided with a support member 15 for supporting the layer of rubber material. The support member 15 of at least one of the arms 11 comprises an attachment surface. Said support member 15 with attachment surface is schematically shown in FIGS. 5 and 6.

The structure of the arms 11 is further illustrated in FIGS. 5 and 6. The arms 11 are elongated and together with the roller 12 serve to turn-up the tyre components against an expanded carcass in the known manner. The arm 11 is furthermore provided with an elongated cover plate 15 placed over the arm 11, which plate forms a support surface 10 at the outer end. At its other end the cover plate 15 is provided with a drive cam 21, extending in a recess 17 of a piston 20, extending in the cylinder 4*b* forming a movable unity with the arm support. At the longitudinal side the arm 11 is provided with support rollers 18 and 19 for the cover plate 15, which rests thereon with edges 30 and 31, which in the direction toward the roller 12 merge into an elevated edge section 23 and 24, respectively. Said sections merge into abutment edges 25 and 26, respectively, which with opposite abutment edges 32, 33 define the axial displacement space for the rollers 18 and 19 (considered relatively). The cover plate 15 is locked against lifting too far (further than the position shown in FIG. 5) with respect to the arm 11 by a transverse pin 22*a* extending below the arm 11 and attached to the pendent side walls 16 of the cover plate 15, particularly the pendent lips 22. A similar retaining pin 21*a* is attached to the drive cam 21.

In the side walls 16 elongated recesses 40 have furthermore been made, through which draw springs 41 extend, that circulate around the drum 2 and serve to urge the arms 1 resiliently into the inactive position, in the manner known per se. As they are secured to the cover plate 15, the draw springs 41 also exert a downward force on the cover plate 15, which force is oriented toward the arm 11.

As can be seen when comparing FIGS. 5 and 6, as a result of the movement of the piston 20 in the cylinder 4*b* in the direction B, the cam 21 will be taken along, so that the cover plate 15 is also moved in the direction B, which direction is parallel to the arm 11 and to the axial main axis of the tyre building drum 2. In that way the support surface 10 will move to the right, and finally fully free the roller 12, so that also its top surface can be active in contact with tyre components during turning up.

After the outer end of the cover plate 15 has passed by the roller 12, the elevated edge sections 23 and 24 will also have arrived at the location of the rollers 18 and 19, so that the cover plate 15 is also able to drop slightly in the direction C with respect to the arms 11. The position shown in FIG. 6 is then reached. The cover plate 15 is then in the fully retracted position. The roller 12 can also extend radially above the support surface 10, so that the tyre components will be detached therefrom and able to roll past it during turning up.

As shown in FIGS. 5 and 6 the cover plate 15 of the arm 11 shown here is provided with an attachment surface comprising smooth surface sections 151 having a substantially saw-tooth-shaped cross-section, at least considered in longitudinal direction of the arm 11. In FIGS. 5 and 6 the size of the saw-teeth 151 is not shown to scale for the sake of clarity. By way of example in practice the height Z of the saw-tooth is approximately 0.5 to 1 mm.

During arranging a tyre component, for instance as pre-fabricated layer or by means of 'strip winding', the cover plates, at least the cover plate 15 with attachment surface, have been placed in the first position of FIG. 5. In that case the smooth surface sections on and/or near the upper side of the saw-teeth 151 ensure the retaining of the strip of rubber material. After the desired layer of the rubber material has been arranged the cover plates, at least the cover plate 15 with attachment surface, are moved into the second position of FIG. 6. Due to the substantially axial shifting B of the cover plate 15 with attachment surface the layer of the rubber material is released from the adhering surface sections near the tip of the saw-teeth 151. The substantially axial shifting thus is in a direction B that is oriented along with an ascending inclined slope of the saw-teeth 151. The cover plates, at least the cover plate 15 with attachment surface, are also displaced in radial direction C, as a result of which the layer of rubber material is placed loose on the cover plates 15 with the smooth surface sections 151, and can be turned up by the roller 12 in the known manner.

By way of example the diameter for a circumferential surface formed by the support surfaces is approximately 15 inches in the inactive position, and the circumferential surface is provided with two groups of forty-eight arms 11 on each side of the plane of symmetry of the building drum. The movement distance in the direction B is approximately 34 mm and in the direction C approximately 3 mm (that means a difference in diameter of 6 mm), at an intermediate distance of the cover plates in the position of FIG. 5 of 0.2 mm, considered in circumferential direction, which enables the displacement in the direction C and yet provides an effectively joined together circumferential surface for the tyre components in the position of FIG. 6. The width of the support surfaces in that case is 23 mm. In the position of FIG. 6 the cover plates 15 abut each other in circumferential direction. Of the forty-eight arms 11 at least one arm is provided with a cover plate 15 having an attachment surface according to the invention.

Figure 7:
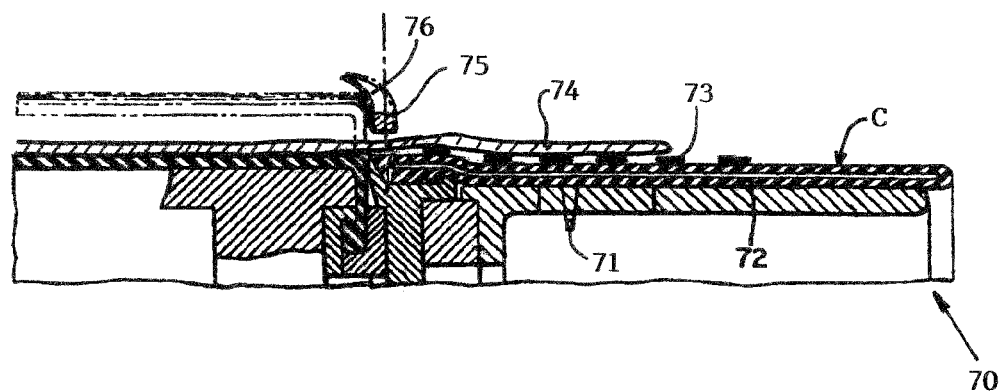
FIGS. 7 and 8 show a schematic view in cross-section of a building drum having a bladder provided with attachment surfaces.
Figure 8:
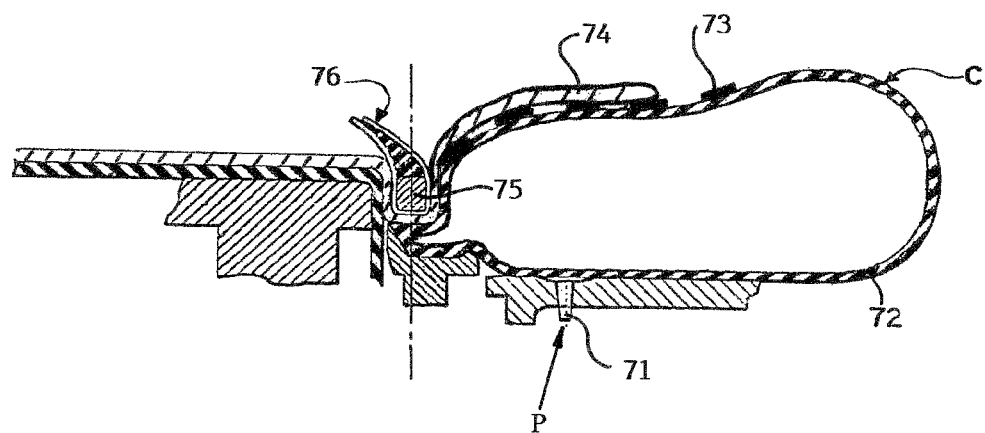

As an alternative to the arms 11 a bladder can also be used, as schematically shown in FIGS. 7 and 8. During arranging a tyre component, for instance as pre-fabricated layer or by means of 'strip winding', the bladder 72 abuts the drum 70 in a folded condition as shown in FIG. 7. A part C of the bladder 72 that is situated outward with respect to the drum 70 forms at least a part of the shaping surface, wherein the part C of the bladder 72 that is situated outward with respect to the drum is provided with an attachment surface 73. The attachment surface 73 comprises a series of small metal plates having a polished surface that in axial direction of the drum are placed spaced apart one behind the other, as shown in FIG. 7.

After the tyre component has been arranged as pre-fabricated layer 74 or by means of 'strip winding', a fluid, for instance compressed air P, is passed into the bladder 72 via the connection 71 as a result of which the bladder is inflated for turning up the layer 74 around a bead core 75 with an apex 76, as shown in FIG. 8. As the bladder 72 is inflated, the part C will bulge as a result of which the small metal plates 73 shift with respect to the layer 74, as a result of which the layer 74 is released from the small metal plates 73.

If the bladder 72 is made of an elastic material, the inflation as shown in FIG. 8 will increase the mutual distance between two consecutive small plates 73, which enhances the release of the layer 74.

In FIGS. 7 and 8 substantially flat small plates 73 are shown. Instead thereof the small plates 73 can also have a saw-tooth-shaped cross-section, at least considered in the longitudinal section of the figures, in accordance with the attachment surface on the cover plate of FIGS. 5 and 6. In that case each small plate 73 may comprise one or more saw-teeth.

Figure 9:
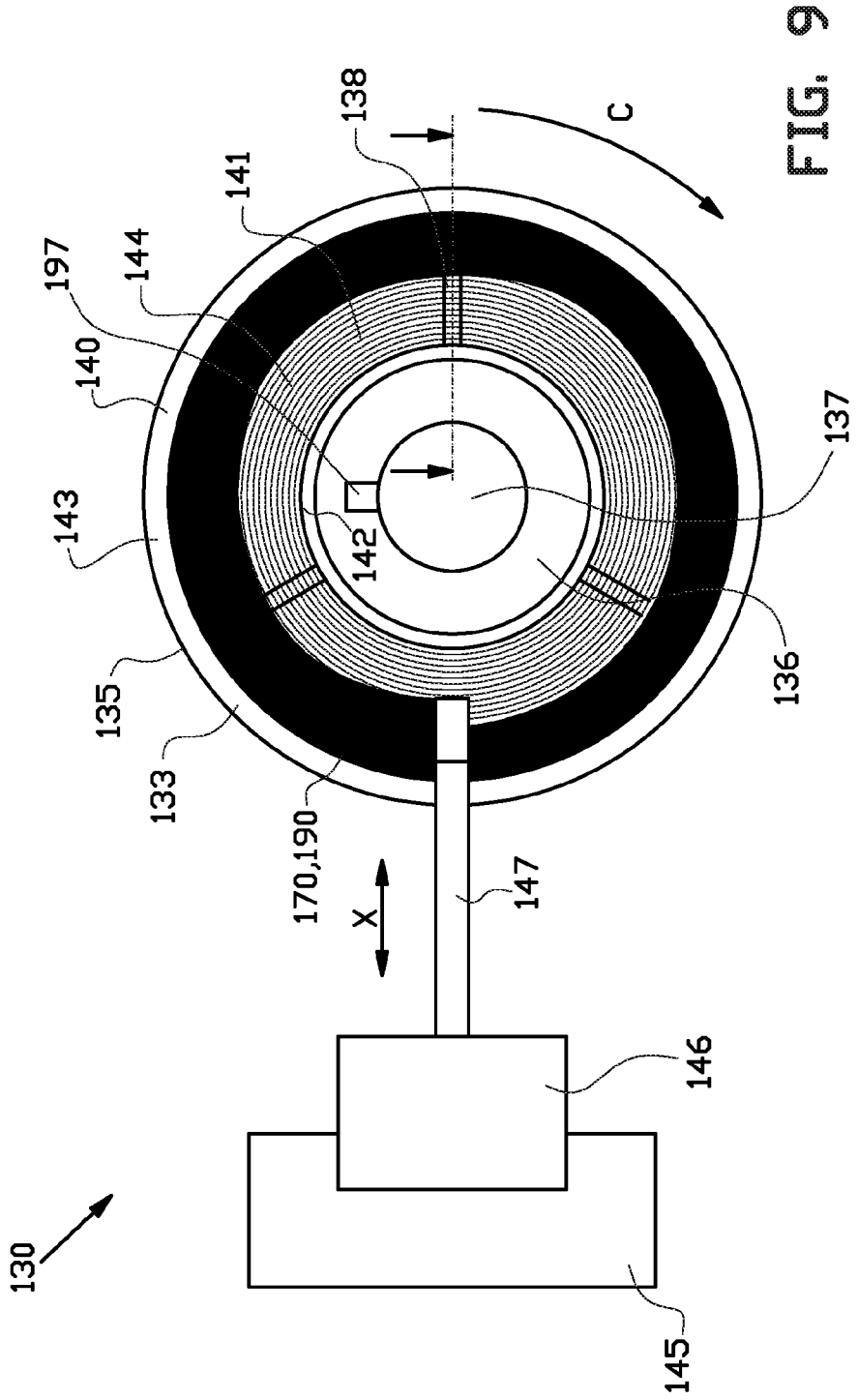
FIG. 9 shows a schematic top view of a disc having a substantially circular shaping surface.

In a further exemplary embodiment as shown in the view of FIG. 9, there is a sidewall building device 130. It is provided with a first circular rotation disc 133, which has a main surface and a centre line extending perpendicular thereto and coinciding with the rotation centre line T (see FIGS. 11 and 12).

The first rotation disc 133 comprises a circular support plate 135 with in its centre a hollow bush 136 defining an opening with which the first rotation disc 133 can be slid concentrically onto a shaft 137. The first rotation disc 133 is provided with securing members, for instance a pin 197 at the inside of the hollow bush 136 for detachable yet rotation-fixed connection of the first rotation disc 133 onto the shaft 137. On one of its main surfaces the support plate 135 is provided with a template 140 bounding a space 141 situated concentrically around the shaft 137 for holding the rubber material which will eventually form the first sidewall 170 or the second sidewall 180.

The template 140 comprises a concentrically circular inner edge 142 for bounding the space 141 near the hollow bush 136 and a concentrically circular outer edge 143 for bounding the space 141 near the circumferential edge of the support plate 135. The distance between inner edge 142 and the outer edge 143 is substantially equal to the desired height of the sidewall 170, 180. In this example the template 140 is furthermore provided with a shaping surface in the form of a sidewall contour surface 144 extending between the inner edge 142 and the outer edge 143. The sidewall contour surface 144 provides the rubber material in the space 141 with a slightly curved or convex shape that will eventually be visible on the sight side of the sidewall 170, 180.

The assembly according to this example furthermore comprises an extrusion device 146 provided with a first extrusion head 147 for extruding a strip 190 of unvulcanized rubber material having a diameter of approximately ten to twenty millimeters. The first extrusion head 147 is oriented toward the space 141 of the template 140 of the first rotation disc 133 for arranging therein the extruded strip 190 for forming the first sidewall 170. The extrusion device 146 is placed on a drive mechanism 145 for displacing the extrusion head 147 with respect to the template 140 in X direction, while the shaft 137 is driven to place the strip 190 helically on the sidewall contour surface 144 in a circulating motion.

The first rotation disc 133 is furthermore provided with an attachment surface 138, for instance in the form of one or more smooth surface sections, particularly polished surface sections.

Figure 10A:
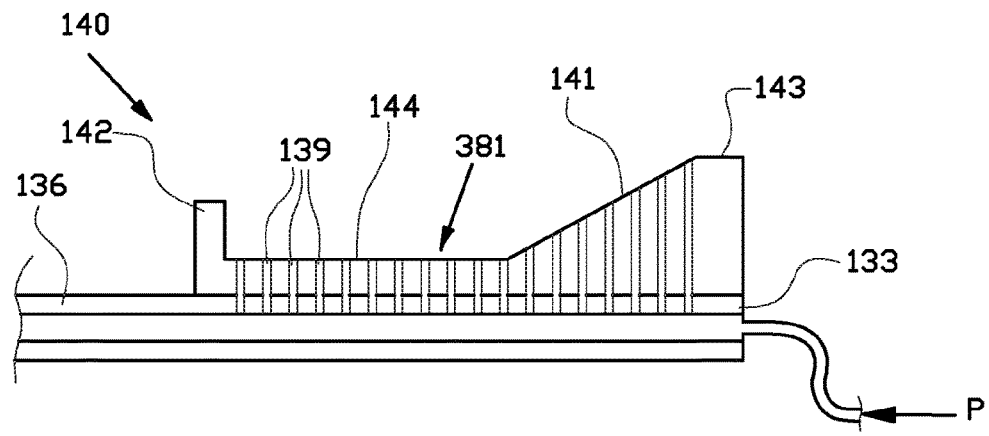
FIGS. 10A and 10B show a schematic view in cross-section of various embodiments of the disc with attachment surface.

FIG. 10A shows the cross-section along the line V-V of FIG. 9 according to a first embodiment. In that case the rotation disc comprises three polished bands 381 extending in radial direction from the rotation disc 133. The bands 381 mutually include an angle of approximately 120 degrees, as schematically shown in FIG. 9. Because of said bands 381 a high level of adhesion of a strip 190 of an unvulcanized rubber placed thereon is achieved. In order to release the sidewall 170, after having been formed, from the template 140, blow openings or blow nozzles 139 have been placed in the polished bands 381, as schematically shown in FIG. 10A. For releasing the sidewall from the template 140 the blow nozzles 139 are connected to a fluid source, for instance compressed air P.

Figure 10B:
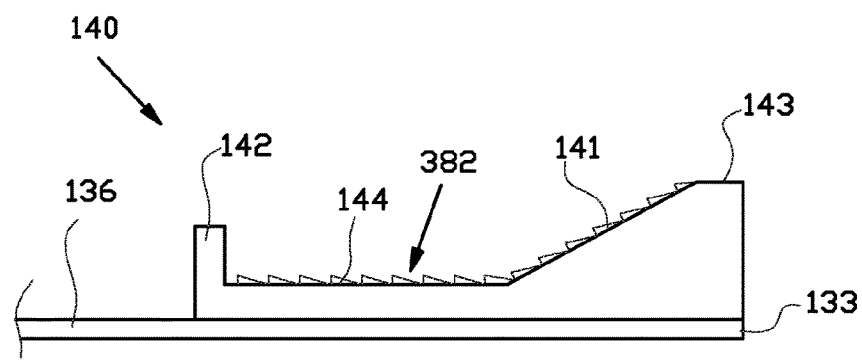

FIG. 10B shows a cross-section along the line V-V of FIG. 9 according to a second embodiment. In the second embodiment the rotation disc 133 comprises three bands having a number of smooth surface sections with non-adhering surface sections placed in between them, wherein the non-adhering surface sections are at least partially receded with respect to the smooth surface sections, wherein the smooth surface sections comprises a substantially saw-tooth-shaped cross-section 382.

Figure 11:
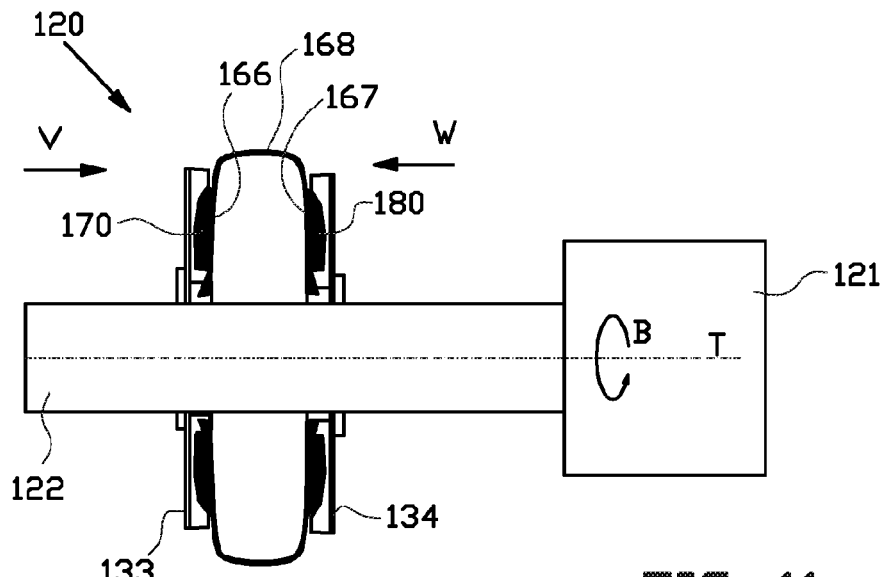
FIGS. 11 and 12 show a schematic view of placing a sidewall on a green tyre.

The sidewalls 170 situated in the template 140 subsequently have to be placed against a carcass package 168. In FIG. 11 the situation is shown in which both the first rotation disc 133 and a second rotation disc 134 have simultaneously been moved in directions V and W, respectively, from both sides towards carcass package 168 that has been put into shape by inflating it. By moving the rotation discs 133 and 134 simultaneously to the sides 166, 167 of the carcass package 168 it can be counteracted that the carcass package 168 deforms as a result of unequal, lateral pressure forces. The sidewalls 170, 180 accommodated in the templates 140 of the rotation discs 133, 134 and made by extrusion, preferably project slightly with respect to the front of the templates 140, so that they can be brought in firm pressing contact with the first side 166 and the second side 167, respectively, of the carcass package 168. As the rubber material has not yet fully cooled down, the sidewalls 170, 180 and the carcass package 168 stick firmly together for effecting a durable connection.

Figure 12:
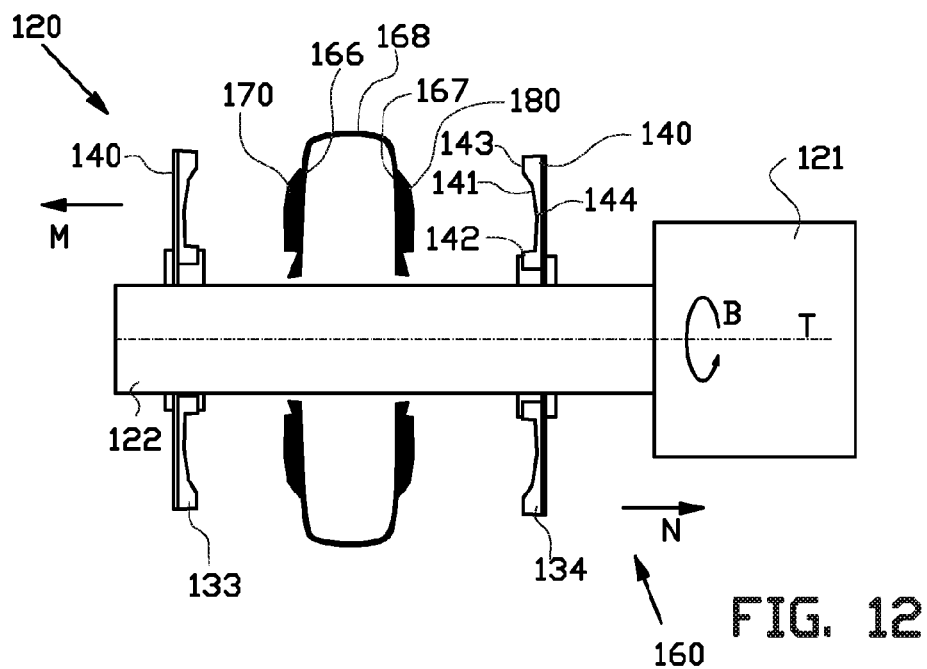

In FIG. 12 the situation is shown in which the first rotation disc 133 is retracted in direction M, wherein the first sidewall 170 has been left behind on the carcass package 168 like a continuous annular band of rubber material. The second rotation disc 134 is retracted in direction N spaced apart from the carcass package 168, wherein also the second sidewall 180 has been left behind on the carcass package 168 like a continuous annular band of rubber material. When displacing the rotation discs 133, 134 away from the carcass package 168, the inner circumferential edge of the sidewalls 170, 180 will be released first from the template 140, optionally supported by the compressed air P from the blow nozzles 139. When further displacing the rotation discs 133, 134 the release of the sidewalls 170, 180 will extend in the direction of the outer circumferential edge of the sidewalls 170, that means substantially away from the carcass drum 122, until the entire sidewalls are released.

The first and second rotation disc 133, 134 can now be removed from the carcass building drum 122 in order to return to the sidewall building device 130 for manufacturing a new sidewall.

Figure 13:
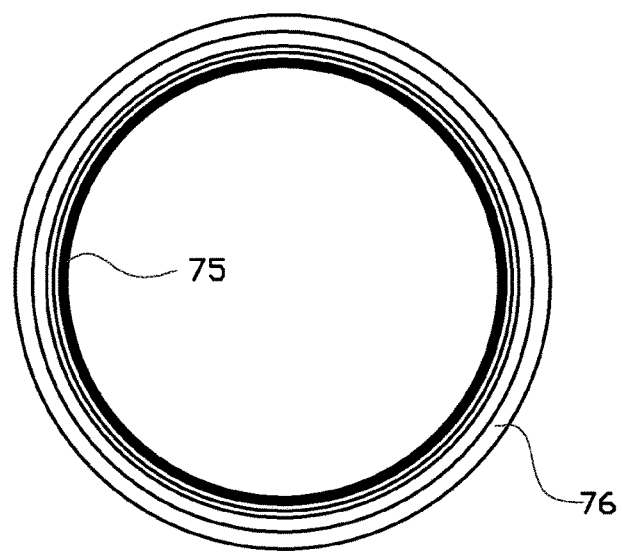
FIGS. 13 and 14, show a schematic view of a circular shape for manufacturing a bead core-apex.
Figure 14:
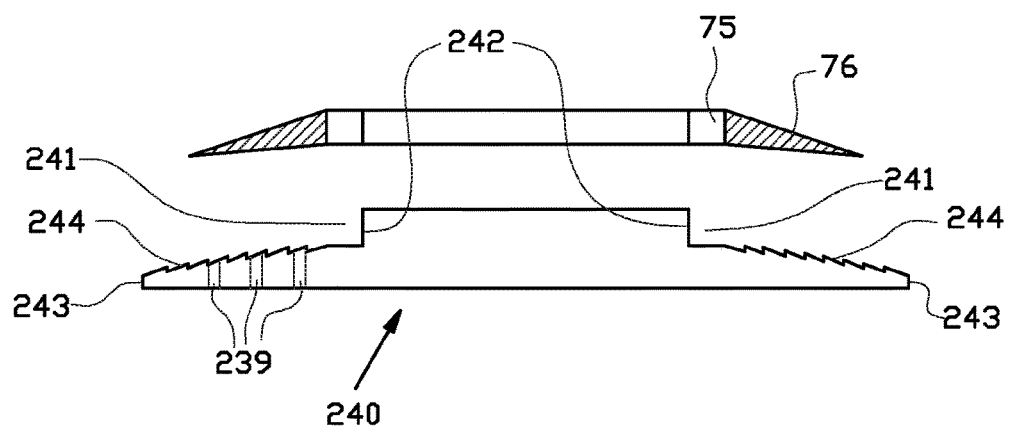

With the correct template 240 a bead core 75 with apex 76 can also be manufactured with the assembly according to the invention. A view in cross-section of such a bead core 75 with apex 76 is schematically shown in FIGS. 7 and 8, and a view of the substantially round bead core 75 with apex 76 is schematically shown in FIG. 13. Such an assembly of bead core 75 and apex 76 can also be manufactured by means of 'strip winding' using the assembly 130 of FIG. 9. However instead of the template 140 of FIG. 9, another template 240 is used. A view in cross-section of the template 240 is schematically shown in FIG. 14.

The template 240 comprises a concentrically circular inner edge 242 for bounding the space 241 near the inner edge 242 for placing a bead core 75, and a concentrically circular outer edge 243. In this example the template 240 is furthermore provided with a shaping surface in the form is an apex-contour surface 244 extending between the inner edge 242 and the outer edge 243. The apex-contour surface 244 provides the rubber material arranged thereon through 'strip winding' with a slightly curved or convex shape. Furthermore the strip of rubber material is arranged such that a substantially wedge-shaped apex 76 is obtained.

The apex-contour surface 244 is furthermore provided with an attachment surface in the form of one or more smooth surface sections, particularly polished surface sections, wherein the smooth surface sections comprise a substantially saw-tooth-shaped cross-section. Alternatively or additionally the smooth surface sections 244 may be provided with blow openings or blow nozzles 239 placed as schematically shown in FIG. 14. For releasing the sidewall from the template 240 the blow nozzles 239 are connected to a fluid source.

When removing a bead core 75 with apex 76 from the template 240, the inner side (at point 241) near the bead core 75 will release first, as this is a fixed point; the bead core 75 is retained during removal. On the outer side the apex 76 will slightly give away, as a result of which the apex 76 will be pulled slightly to the inside and be released due to the shape of the saw-tooth-shaped attachment surfaces.

The above description is included to illustrate the operation of preferred embodiments of the invention and not to limit the scope of the invention. Starting from the above explanation many variations that fall within the spirit and scope of the present invention will be evident to an expert.

The invention claimed is:

1. An assembly for manufacturing a green tyre, comprising a drum having an axial main axis and an outwardly oriented shaping surface with respect to the axial main axis for placing a tyre component thereon comprising a layer of unvulcanized rubber, wherein the shaping surface is provided with an attachment surface for temporarily retaining at least a leading section of the tyre component, characterized in that the attachment surface comprises a number of adhering surface sections with non-adhering surface sections placed in between them, wherein the non-adhering surface sections are receded with respect to the adhering surface sections, wherein the attachment surface comprises a saw-tooth-shaped cross-section forming saw-teeth, wherein the saw-tooth-shape comprises alternately inclined ascending flanks and steep transitions from the one to the next saw-tooth, wherein at least the tip of the inclined ascending flanks of the saw-teeth form the adhering surface sections and the steep transitions and/or the parts of the inclined ascending flanks adjacent to the steep transitions form the non-adhering, receded surface sections in between the adhering surface sections, wherein the drum is further provided with a release device for releasing at least the leading section of the tyre component, wherein the release device comprises a displacement device for displacing at least the attachment surface in an axial shifting direction parallel to the attachment surface, wherein the inclined flanks are ascending in a direction opposite to the shifting direction, wherein due to the combination of the adhering surface sections and the non-adhering surface sections, the level of adhesion is large enough for retaining the leading section of the tyre component on the attachment surface during its arrangement and small enough so that the tyre component is released from the shaping surface when the attachment surface moves in the axial shifting direction, wherein the attachment surface comprises a band with the number of adhering surface sections, wherein the drum is provided with a set of arms that extend axially, wherein at a first free outer end each arm is provided with a turn-up roller, and at an opposite second outer end is hinged to an axially slidable arm support, wherein at its first outer end each arm is provided with a support member for supporting the tyre component, wherein the support member of at least one of the arms comprises the attachment surface.

2. The assembly according to claim 1, wherein the displacement device is adapted for at least displacing the attachment surface in a direction perpendicular to the layer of unvulcanized rubber.

3. The assembly according to claim 1, wherein the band extends parallel to a centre line of the drum.

4. The assembly according to claim 1, wherein the support members can be displaced in the axial direction of the drum.

5. The assembly according to claim 1, wherein the number of adhering surface sections with non-adhering surface sections placed in between them are placed consecutively in the axial direction of the drum.

6. The assembly according to claim 1, further comprising an extrusion device for extruding a strip of the unvulcanized rubber, wherein the shaping surface of the drum faces the extrusion device, and wherein the extrusion device and the drum can be displaced with respect to each other for placing the strip of the unvulcanized rubber on the shaping surface for forming the layer of unvulcanized rubber of the tyre component.

7. The assembly according to claim 6, wherein the drum and the extrusion device can be displaced with respect to each other for winding the strip of the unvulcanized rubber around the drum into the layer of rubber material.

\* \* \* \* \*